(12) United States Patent
Wang et al.

(10) Patent No.: US 7,424,392 B1
(45) Date of Patent: Sep. 9, 2008

(54) APPLYING A SELF-ADAPTIVE FILTER TO A DRIFTING PROCESS

(75) Inventors: Jin Wang, Austin, TX (US); Robert J. Chong, Austin, TX (US); Christopher A. Bode, Austin, TX (US); Si-Zhao J. Qin, Austin, TX (US); Alexander J. Pasadyn, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 846 days.

(21) Appl. No.: 10/323,502

(22) Filed: Dec. 18, 2002

(51) Int. Cl.
*G06F 17/18* (2006.01)
*G21C 17/00* (2006.01)

(52) U.S. Cl. .................... 702/182; 702/181

(58) Field of Classification Search ......... 702/179–182, 702/33–36, 81, 82, 84; 700/108–110, 121
See application file for complete search history.

(56) References Cited

U.S. PATENT DOCUMENTS

| | | | | |
|---|---|---|---|---|
| 6,470,230 | B1 * | 10/2002 | Toprac et al. | 700/121 |
| 6,678,570 | B1 * | 1/2004 | Pasadyn et al. | 700/109 |
| 6,766,214 | B1 * | 7/2004 | Wang et al. | 700/121 |
| 6,912,433 | B1 * | 6/2005 | Chong et al. | 700/110 |
| 2004/0040001 | A1 * | 2/2004 | Miller et al. | 716/4 |

OTHER PUBLICATIONS

Woo, Wilbur W.; Svoronos, Spyros A.; Sankur, Haluk O.; Bajaj, Jagmohan; Irvine, Stuart J.; *In-Situ Estimation of MOCVD Growth Rate via a Modified Kalman Fiter*, AIChE Journal, vol. 42, No. 5, May 1996, pp. 1319-1325.

Yaz, Edwin, E.' Bari, Mohammad J.; *Recursive State Estimators for General Discrete-Time Stochastic Nonlinear Models*, Proceedings of the 36th Conference on Decision & Control, San Diego, CA, Dec. 1997, pp. 5030-5035.

Vincent, Tyrone L., Khargonekar, Pramod P.; Terry, Jr., Fred L.; *An Extended Kalman Filtering-Based Method of Processing Reflectometry Data for Fast In-Situ Etch Rate Measurements*, IEEE Transactions on Semiconductor Manufacturing, vol. 10, No. 1, Feb. 1997, pp. 42-51.

Vincent, Tyrone L.; Khargonekar, Pramod P., *A Class of Nonlinear Filtering Problems Arising from Drifting Sensor Gains*, IEEE Transactions on Automatic Control, vol. 44, No. 3, Mar. 1999, pp. 509-520.

* cited by examiner

*Primary Examiner*—Michael P Nghiem
(74) *Attorney, Agent, or Firm*—Williams, Morgan & Amerson, P.C.

(57) ABSTRACT

A method and an apparatus are provided for applying a self-adaptive filter to a drifting process. The method includes processing a workpiece, measuring an output characteristic of the processed workpiece and modifying a previous estimated process state based at least on the measured output characteristic. The method further includes estimating a next process state based at least on the modified previous estimated process state.

26 Claims, 7 Drawing Sheets

APPLYING A SELF-ADAPTIVE FILTER TO A DRIFTING PROCESS

BACKGROUND OF THE INVENTION

1. Field of the Invention

This invention relates generally to an industrial process, and, more particularly, to applying a self-adaptive filter to a drifting industrial process, such as a semiconductor fabrication process.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a group of wafers, sometimes referred to as a "lot," using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial improvements.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface that facilitates communications between the manufacturing tool and the manufacturing framework. The machine interface can generally be part of an Advanced Process Control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process, various events may take place that affect the performance of the devices being fabricated. That is, variations in the fabrication process steps result in device performance variations. Factors, such as feature critical dimensions, doping levels, particle contamination, film optical properties, film thickness, film uniformity, etc., all may potentially affect the end performance of the device. Various tools in the processing line are controlled in accordance with performance models to reduce processing variation. Commonly controlled tools include photolithography steppers, polishing tools, etching tools, and deposition tools, etc. Pre-processing and/or post-processing metrology data is supplied to process controllers for the tools. Operating recipe parameters, such as processing time, are calculated by the process controllers based on the performance model and the metrology data to attempt to achieve post-processing results as close to a target value as possible. Reducing variation in this manner leads to increased throughput, reduced cost, higher device performance, etc., all of which equate to increased profitability.

Run-to-run control in semiconductor manufacturing is a type of batch control, where a batch may be as small as one wafer or as large as several lots of wafers. The standard output of a run-to-run controller is a process recipe. This recipe defines the set points for "low-level" controllers built into the processing tool. In this way, the run-to-run controller supervises the tool controller by specifying required values for process variables such as temperature, pressure, flow, and process time. The tool controller initiates the activities necessary to maintain these variables at the requested values. A typical run-to-run control setup includes a feedback loop where adjustments are made to the recipe parameters based on batch properties measured after processing. Typically, the job of the run-to-run controller is to ensure that each batch hits its inline target values. Inline targets refer to measurements that are taken while the wafers have only completed some of their processing steps. The inline targets are designed to provide guidelines for the functional parts at the end of the manufacturing line.

Because the process states and other variables in the manufacturing processes can change over time, a successful controller must adapt to changing process conditions. At the foundation of such an adaptive controller are system identification techniques that aim to determine a model with the same input-output characteristics and possibly the same natural model structure as the physical system under study. In many practical applications, it is not feasible to obtain an exact model form for the process under study. Thus, online system identification often takes the form of a parameter estimation problem. In this formulation, a form for the model is predetermined, and the model parameters are updated recursively from process data. Changing process conditions can be seen as a change in the estimated model parameters over time.

To achieve adequate performance in an uncertain environment, the control system should react quickly to process changes. Adaptive control techniques are a class of control schemes where the controller automatically adjusts its model parameters and tunes to account for observed changes in the process itself. These techniques often rely on online model parameter estimation, and the controller settings are continually adjusted to match the current system model derived from the measurements.

Online system identification techniques are active as the process under study is running. They use process measurements and recursively update a system model of predetermined form. The estimator observes the system and adjusts the model parameters within the chosen model structure. In general, the estimator does not have a complete set of data with which to work. It only has access to the measurements that have already been made.

A common exponentially weighted moving average (EWMA) filtering technique can be used in recursive parameter estimation. Here, a new parameter estimate is obtained by using a weighted combination of a parameter estimate based on the current measurement and the current parameter estimate as shown:

$$\tilde{x}_{k+1} = \lambda x_k + (1-\lambda)\tilde{x}_k, \quad (1)$$

where x is the measured value, $\tilde{x}$ is the estimate, and $\lambda$ is the exponential weighting factor. While the EWMA filtering technique is generally effective, it may not be particularly effective in estimating the true process state because of the presence of drifting disturbances and non-linear, changing slope. The EWMA filtering technique is slow to react to a fast drifting process in order to filter white noise (for example, when $\lambda<0.5$).

Aside from the EWMA filtering techniques, Kalman filters can also be used in recursive parameter estimation. While Kalman filters are generally useful in drifting processes, they are not generally effective when non-white noise is present (e.g., a change in the slope of the drift).

The present invention is directed to overcoming, or at least reducing the effects of, one or more of the problems set forth above.

SUMMARY OF THE INVENTION

In one embodiment of the present invention, a method is provided for applying a self-adaptive filter to a drifting process. The method comprises processing a workpiece, measuring an output characteristic of the processed workpiece and modifying a previous estimated process state based at least on the measured output characteristic. The method further comprises estimating a next process state based at least on the modified previous estimated process state.

In another embodiment of the present invention, an apparatus is provided for applying a self-adaptive filter to a drifting process. The apparatus comprises an interface communicatively coupled to a control unit. The interface is adapted to receive an output characteristic of a processed workpiece. The control unit is adapted to modify a previous estimated process state based at least on the received output characteristic and estimate a next process state based at least on the modified previous estimated process state.

In a further embodiment of the present invention, an article comprising one or more machine-readable storage media containing instructions is provided for applying a self-adaptive filter to a drifting process. The one or more instructions, when executed, enable the processor to receive a measured output characteristic of a processed workpiece, modify a previous estimated process state based at least on the received output characteristic and estimate a next process state based at least on the modified previous estimated process state.

In a further embodiment of the present invention, a system is provided for applying a self-adaptive filter to a drifting process. The system comprises a processing tool and a controller. The processing tool is adapted to process a workpiece. The controller is adapted to receive a measured output characteristic associated with the processed workpiece, modify a previous estimated process state of the processing tool based at least on the measured output characteristic and estimate a next process state of the processing tool based at least on the modified previous estimated process state.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
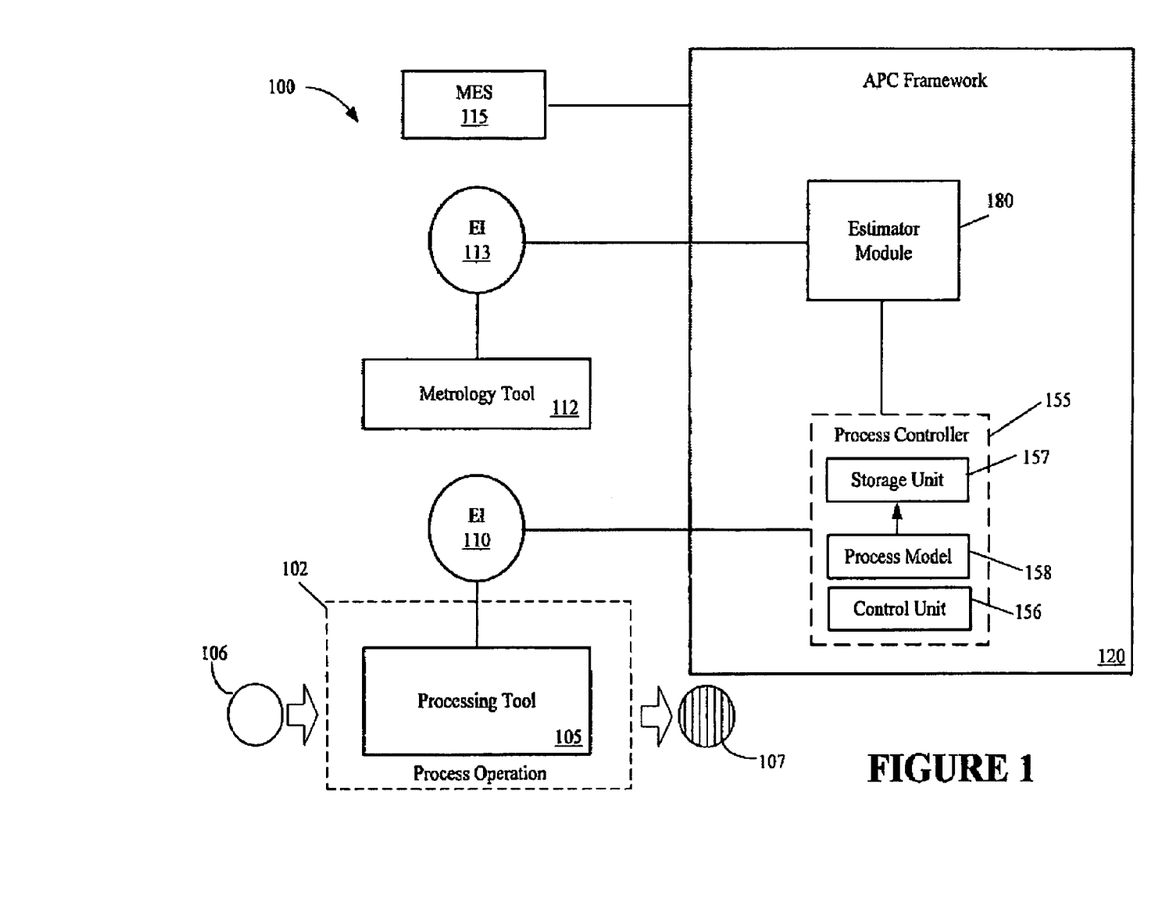
FIG. 1 illustrates an industrial system, in accordance with one embodiment of the present invention.

Turning now to the drawings, and specifically referring to FIG. 1, a block diagram of a system 100 is illustrated, in accordance with one embodiment of the present invention. The system 100, in the illustrated embodiment, includes at least one process operation 102 for implementing an industrial process, such as a semiconductor fabrication process, a photographic process, a chemical process, or any other process in which the process state(s) or process output may drift with time.

In the system 100, the process operation 102 may be performed using one or more processing tools 105. Generally, the particular type of process operation 102 that is performed, and the type of processing tool(s) 105 employed in that process operation 102, depends on the particular implementation. For example, in the context of a chemical industrial process, the process operation 102 may include processing a polymer. In the context of a photographic process, the process operation 102 may, for example, include processing a film.

For illustrative purposes, the process operation 102 depicted in FIG. 1 is at least a portion of a semiconductor fabrication process, which, for example, may be part of an overall semiconductor process flow. Examples of the process operation 102 may be an etch process, deposition process, chemical mechanical planarization (CMP), and the like. The processing tool 105, in the illustrated embodiment, may take the form of any semiconductor fabrication equipment used to produce a processed workpiece, such as a silicon wafer. The semiconductor process may be utilized to produce a variety of integrated circuit products including, but not limited to, microprocessors, memory devices, digital signal processors, application specific integrated circuits (ASICs), or other similar devices. An exemplary processing tool 105 may include an exposure tool, an etch tool, a deposition tool, a polishing tool, a rapid thermal anneal processing tool, a test-equipment tool, an ion implant tool, a packaging tool and the like.

In the system 100 of FIG. 1, the processing tool 105 has an associated equipment interface 110, and a metrology tool 112 has an associated equipment interface 113, for interfacing with an Advanced Process Control (APC) framework 120. In the illustrated embodiment, the metrology tool 112 measures aspects of the workpieces (e.g. wafers) 106 that are processed in the process operation 102 to provide processed workpieces 107. The metrology tool 112, in one embodiment, may be capable of measuring aspects of the workpieces off-line, in-line, in Situ or a combination thereof.

The manufacturing system 100 may include a manufacturing execution system (MES) 115 that is coupled to the APC framework 120. The manufacturing execution system 115 may, for example, determine the processes that are to be performed by the processing tool 105, when these processes are to be performed, how these processes are to be performed, etc. In the illustrated embodiment, the manufacturing execution system 115 manages and controls the overall system through the APC framework 120.

An exemplary APC framework 120 that may be suitable for use in the manufacturing system 100 may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The APC framework 120 includes a process controller 155 that, through a feedback or feedforward process, aids the processing tool 105 towards performing a desired process to thereby achieve a desired result. The process controller 155 in the illustrated embodiment includes a control unit 156, a storage unit 157, and a process model 158 that is storable in the storage unit 157. The process controller 155, based at least on an input from an estimator module 180, uses the process model 158 to determine the next control move for the processing tool 105. The particular control actions taken by the process controller 155 depend on the particular processes performed by the processing tool 105, and the output from the estimator module 180.

The process model 158 may be developed empirically using commonly known linear or non-linear techniques. The process model 158 may be a relatively simple equation-based model (e.g., linear, exponential, weighted average, etc.) or a more complex model, such as a neural network model, principal component analysis (PCA) model, partial least squares projection/latent structures (PLS) model, or the like. The specific implementation of the process model 158 may vary depending on the modeling techniques selected and the process being controlled. The process controller 155, in one embodiment, maintains incoming "state" information associated with the process operation 102, where the "state" information may be based at least in part on the characteristics (i.e., wafer state data) of the wafer selected for gathering metrology data and/or state information known about the controlled processing tool 105 (i.e., tool state data).

In the illustrated embodiment, the process controller 155 is computer programmed with software to implement the functions described. However, as will be appreciated by those of ordinary skill in the art, a hardware controller designed to implement the particular functions may also be used. Moreover, the functions performed by the process controller 155, as described herein, may be performed by multiple controller devices distributed throughout a system. Additionally, the process controller 155 may be a stand-alone controller, resident in the processing tool 105, or part of a system controlling operations in an integrated circuit manufacturing facility.

The estimator module 180 estimates the next tool state of the processing tool 105 (or the next processing state) based on metrology data associated with a previously processed workpiece and a previous estimate state. The estimator module 180 receives data from the metrology tool 112 via the associated equipment interface 113. One embodiment of the estimator module 180 is described in FIG. 2, which is discussed in greater detail below. Referring again to FIG. 1, the estimator module 180 provides the estimated next tool state to a process controller 155, which then generates the next recipe or control move for the processing tool 105 based on the estimated next tool state. For example, in the context of an etching process, the estimator module 180 may estimate an etch rate of the processing tool 105, and then provide the estimated etch rate to the process controller 155, which then determines an etch time (i.e., recipe) that the processing tool 105 should etch the next workpiece (e.g., wafer).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

It should be understood that the illustrated components shown in the block diagram of the system 100 in FIG. 1 are illustrative only, and that, in alternative embodiments, additional or fewer components may be utilized without deviating from the spirit or scope of the invention. For example, in one embodiment, the MES 115 may interface with the APC framework 120 through an associated equipment interface. Additionally, it should be noted that although various components, such as the equipment interface 110 of the system 100 of FIG. 1 are shown as stand-alone components, in alternative embodiments, such components may be integrated into the processing tool 105. Similarly, the estimator module 180 may be integrated into the process controller 155.

Figure 2:
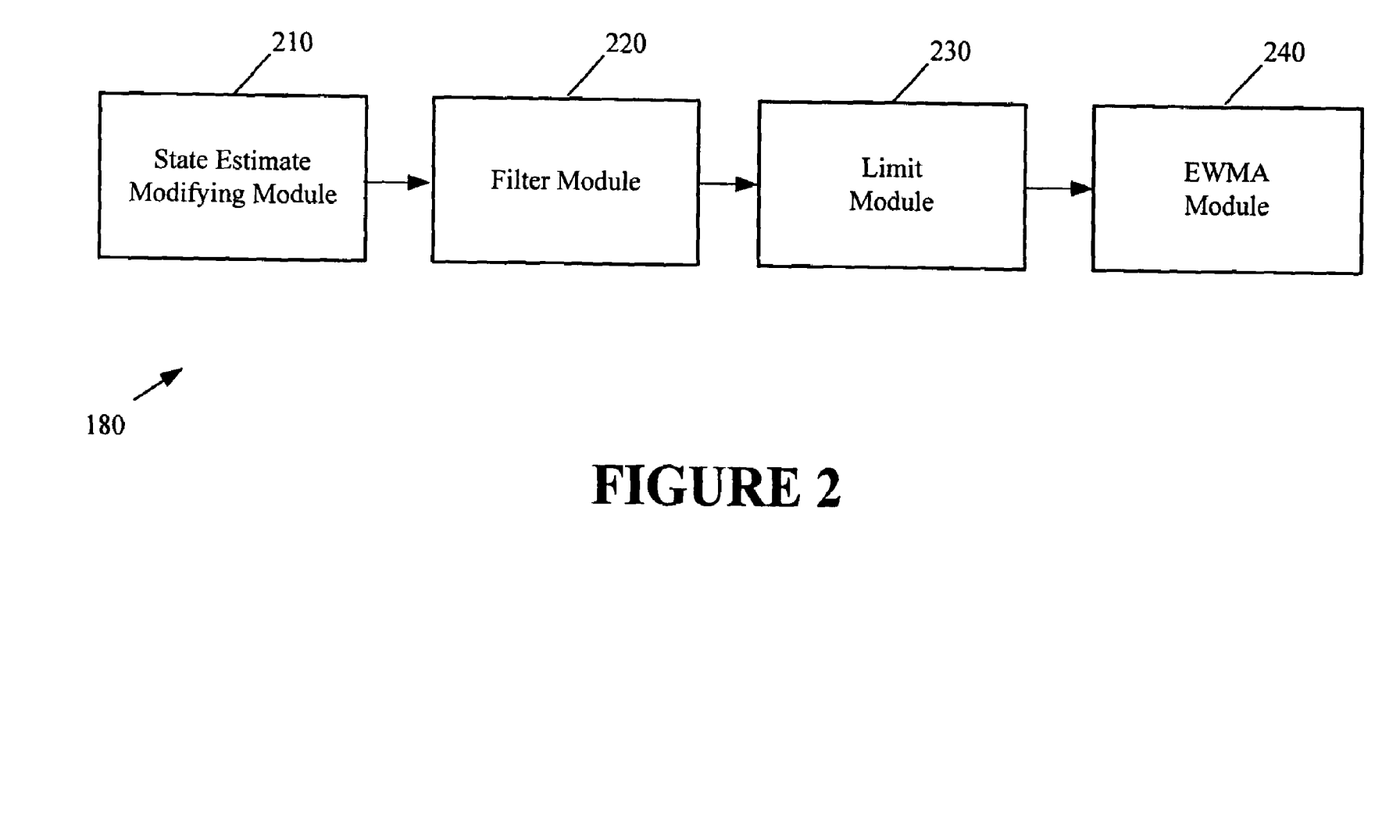
FIG. 2 depicts a flow diagram of an estimator module that may be implemented in the industrial system of FIG. 1, in accordance with one embodiment of the present invention.

Referring now to FIG. 2, a block diagram of the estimator module 180 is illustrated, in accordance with one embodiment of the present invention. The estimator module 180 includes a state estimate modifying module 210, a filter module 220, a limit module 230, and an EWMA module 240. The estimator module 180 of FIG. 2 is described in the context of the industrial system 100 of FIG. 1. Moreover, for the purposes of describing the estimator module 180 of FIG. 2, it is herein assumed that the process operation 102 of FIG. 1 is an etch process and that the processing tool 105 is an etch tool.

The estimator module 180, in one embodiment, uses a state space model that describes the system dynamics of the etching process depicted by the process operation 102 of FIG. 1. For illustrative purposes, it is herein assumed that the dynamic behavior of the etch rates of the processing tool 105 can be described using a linear drift model shown in equations (2) and (3):

$$x(k+1)=Ax(k)+v(k), \qquad (2)$$

$$y(k)=Cx(k)+w(k), \qquad (3)$$

where exemplary values of A and C may be $$A = \begin{bmatrix} 1 & 1 \\ 0 & 1 \end{bmatrix}$$

and $$C = \begin{bmatrix} 1 & 0 \end{bmatrix}$$

In the illustrated example, $$x(k) = \begin{bmatrix} x1(k) \\ x2(k) \end{bmatrix},$$

and thus comprises two states, an etch rate state $x_1(k)$ and a slope of the drift state $x_2(k)$. In the above equations, y(k) represents the output measurement (e.g., actual measured etch rate), v(k) represents the process noise term, and w(k) represents the measurement noise.

The filter module 220 in the illustrated embodiment includes a Kalman filter for predicting the next state of the processing tool 105 or predicting the next processing state. In alternative embodiments, other filters or filtering techniques may be employed to predict the next process or tool states. Because the filter module 220 includes a Kalman filter, the general form of the steady-state filter module 220 is illustrated by equation (4):

$$\hat{x}(k+1) = A\hat{x}(k) + L(y(k) - C\hat{x}(k)), \quad (4)$$

where L is the Kalman filter gain, and $\hat{x}(k)$ is the estimate of x(k).

As shown in equation (4), the next estimate process state, $\hat{x}(k+1)$, is typically calculated based on the previous state estimate, $\hat{x}(k)$. In accordance with one embodiment of the present invention, the previous state estimate, $\hat{x}(k)$, is modified by the state estimate modifying module 210 before it is provided to the filter module 220 (i.e., the Kalman filter in this example). In particular, in one embodiment, the first element (etch rate), $\hat{x}_1(k)$, of the previous state estimate, $\hat{x}(k)$, is modified in the manner set forth in equation (5):

$$\hat{x}_1(k)_{new} = \zeta\hat{x}(k) + (1-\zeta)y(k), \quad (5)$$

where $\zeta$ is a weighting factor within an exemplary range of 0 and 1, y(k) is the process output (i.e., the actual measured etch rate in this example), and $\hat{x}(k)_{new}$ represents the modified first element of the previous state estimate. In an alternative embodiment, the state estimate modifying module 210 may modify the previous state estimate in the manner described by equation (6) below:

$$\hat{x}_1(k)_{new} = \zeta\hat{x}(k) + (1-\zeta)(y(k) + y(k-1))/2, \quad (6)$$

where $\zeta$ is a weighting factor within an exemplary range of 0 and 1, and y(k) and y(k-1) are the two previous process outputs (i.e., in this example, the two previous actual measured etch rates). As can be seen, in equation (6), the new previous state, $\hat{x}_1(k)_{new}$, is calculated based on combining the previous estimate state, $\hat{x}_1(k)$, with an average of the two previous process outputs (i.e., y(k)+y(k-1)/2). In alternative embodiments, the previous estimate state, $\hat{x}_1(k)$, can be modified in any other desirable manner based on the process output y(k) or previous outputs (i.e., y(k-1), y(k-2), and so forth).

Once the previous estimate state, $\hat{x}_1(k)$, is modified using equations (5) or (6), the state estimate modifying module 210 provides the modified estimate state to the filter module 220, which then estimates the next process state, $\hat{x}(k+1)$. The next process state, $\hat{x}(k+1)$, may be calculated by substituting the modified previous state estimate, $\hat{x}(k)_{new}$, for the previous state estimate, x(k), in equation (4) above. The result of this substitution is shown in equation (7) below:

$$\hat{x}(k+1) = A\hat{x}(k)_{new} + L(y(k) - C\hat{x}(k)_{new}), \quad (7)$$

Thus, the filter module 220, estimates the next process state, $\hat{x}(k+1)$, in the manner set forth in equation (7). The combination of the state estimate modifying module 210 and the filter module 220 forms an "adaptive" filter in the sense that when a process disturbance is introduced, the disturbance causes a large difference between $\hat{x}(k)$ and y(k). This difference translates into $\hat{x}(k)_{new}$ diverging from $\hat{x}(k)$, which changes the Kalman Gain, as is evident by inspection of equation (7) above. Thus, the larger the difference between $\hat{x}(k)$ and y(k), the larger the change within the Kalman Gain.

The estimator module 180 of FIG. 2 in the illustrated embodiment includes the limit module 230 and the EWMA module 240 that is coupled to the output of the limit module 230. The limit module 230, in one embodiment, may be utilized to control the change in the slope of the drift (i.e., the second state of $\hat{x}(k)$) that is provided by the Kalman filter. That is, in order to prevent sudden, large changes in the slope of the drift, which may adversely affect the estimation of the process states, the limit module 230 may limit the changes to some maximum preselected value. Limiting the amount of change in the slope of the drift to the preselected value may be needed in some circumstances because of the inherent delays associated with receiving the metrology data or errors associated with measurements of output characteristics. The EWMA module 240 of the estimator module 180 may be employed to reduce error variance in the estimated process states.

Although in the illustrated embodiment of FIG. 2, the estimator module 180 includes modules 210, 220, 230, and 240, in an alternate embodiment the estimator module 180 may not necessarily employ all four modules, depending on the implementation. For example, in one embodiment, if the features of the limit module 230 and EWMA module 240 are not desired, the estimator module 180 may include the state estimate modifying module 210 and the filter module 220. As another example, if a reduction in estimate error variance provided by the EWMA module 240 is not desired, then the estimator module 180 may include modules 210, 220, and 230. Similarly, other combinations may be desirable, depending on the particular implementation. The modules 210, 220, 230, and 240 may be implemented in hardware, software, or a combination thereof.

Figure 3:
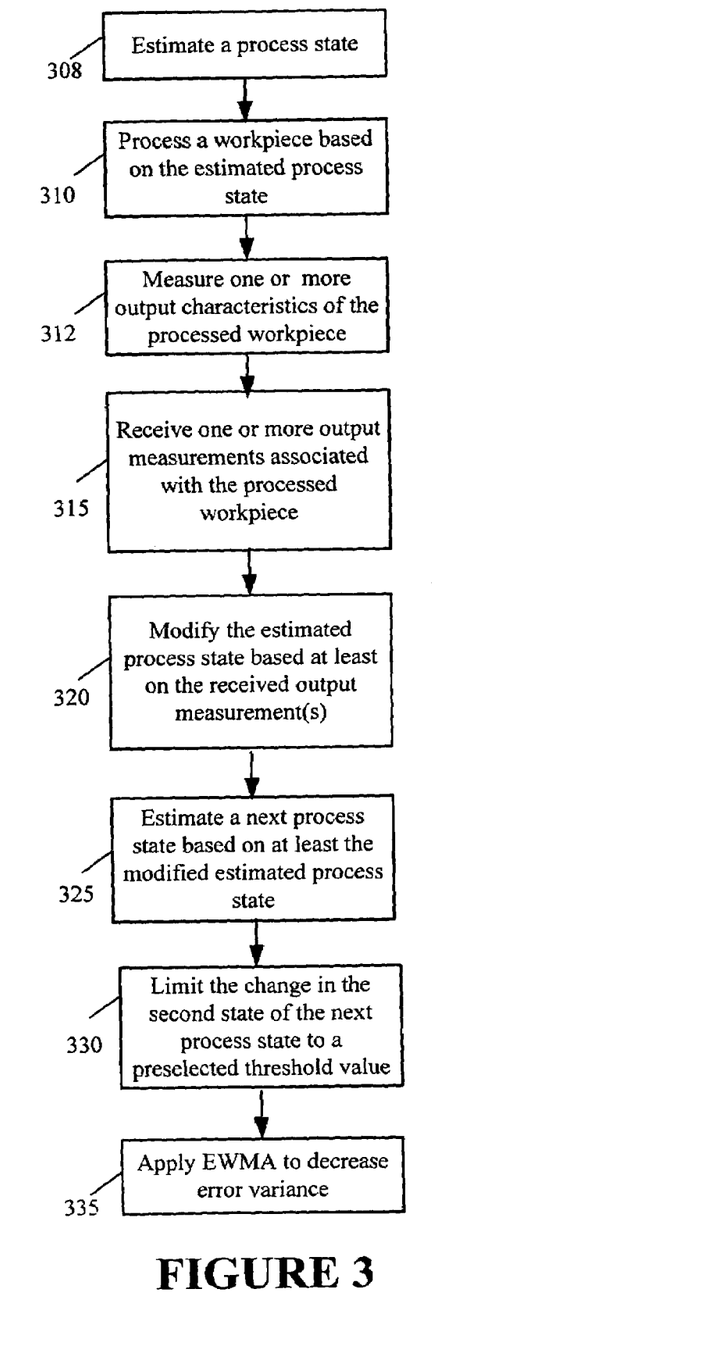
FIG. 3 illustrates a flow diagram of a method that may be implemented in the industrial system of FIG. 1, in accordance with one embodiment of the present invention.

Referring now to FIG. 3, a flow diagram of a method that may be implemented in the manufacturing system 100 of FIG. 1 is illustrated, in accordance with one embodiment of the present invention. For ease of illustration, the method of FIG. 3 is described in the context of an etch process, although the method is not limited as such and may be applicable to any drifting process. The estimator module 180 estimates (at 308) a process state, which in the illustrated example is an etch rate. The etch rate, in one embodiment, is provided to the process controller 155, which determines a control move (e.g., etch time) for the processing tool 105.

The processing tool 105 processes (at 310) a workpiece based on the estimated process state. In the context of an etch process, the processing tool 105 etches a wafer based on the recipe (or control move) that is generated based on the estimated etch rate.

The metrology tool 112 (or an in-situ metrology tool) measures (at 312) one or more output characteristics of the workpiece processed (at 310) by the processing tool 105. In the context of an etch process, the metrology data may, for example, include the etch depth of the processed wafer. The metrology data is provided to and received by (at 315) the estimator module 180.

The estimator module 180 modifies (at 320) the estimated process state (see block 308) based at least on the received output measurements. Because the estimated process state was calculated for the previously processed workpiece, it is hereinafter referred to as "the previous process state estimate." In one embodiment, the previous process state estimate is modified in a manner set forth in equation (5) or (6), depending on the desired implementation. The modified "previous process estimate" is then provided to the filter module 220.

The filter module 220 estimates (at 325) a next process state based on at least the modified estimated process state. In one embodiment, the filter module 220 estimates the next process state (at 325) in accordance with equation (7) set forth above.

In one embodiment, the limit module 230 may be utilized to limit (at 330) the change in the second state of the next process state to a preselected threshold value. As noted above, the second state, in the illustrated example, corresponds to a drifting slope state. The preselected threshold value that is chosen depends on the particular implementation, and may be a range of values, in one embodiment. For example, in the context of an etch process, the preselected threshold value may be a range from −0.01 to −0.1 that defines the minimum and maximum change in the slope that is allowed.

In one embodiment, the EWMA module 240 may be applied (at 335) to reduce error variance in the next process state determined by the filter module 220. That is, the EWMA module 240 may apply the conventional common exponentially weighted moving average filtering technique to further improve the process state estimation.

While the method of FIG. 3 is described in the context of processing a single workpiece, it should be understood that the method is not limited as such. The method can be readily extended to a process in which a batch or a lot of workpieces are processed substantially simultaneously.

Figure 4:
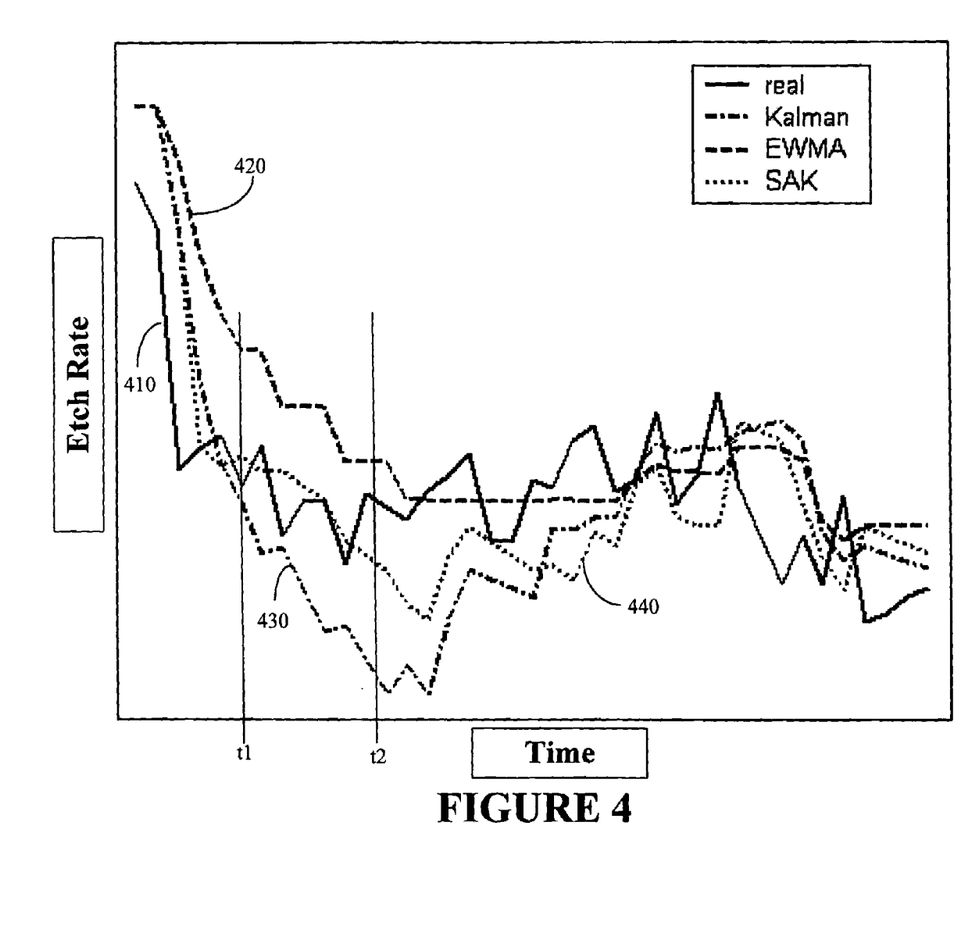
FIGS. 4-7 illustrate exemplary graphs comparing the outputs of the various embodiments of the estimator module of FIG. 2 to the outputs of conventional state estimation techniques.
Figure 5:
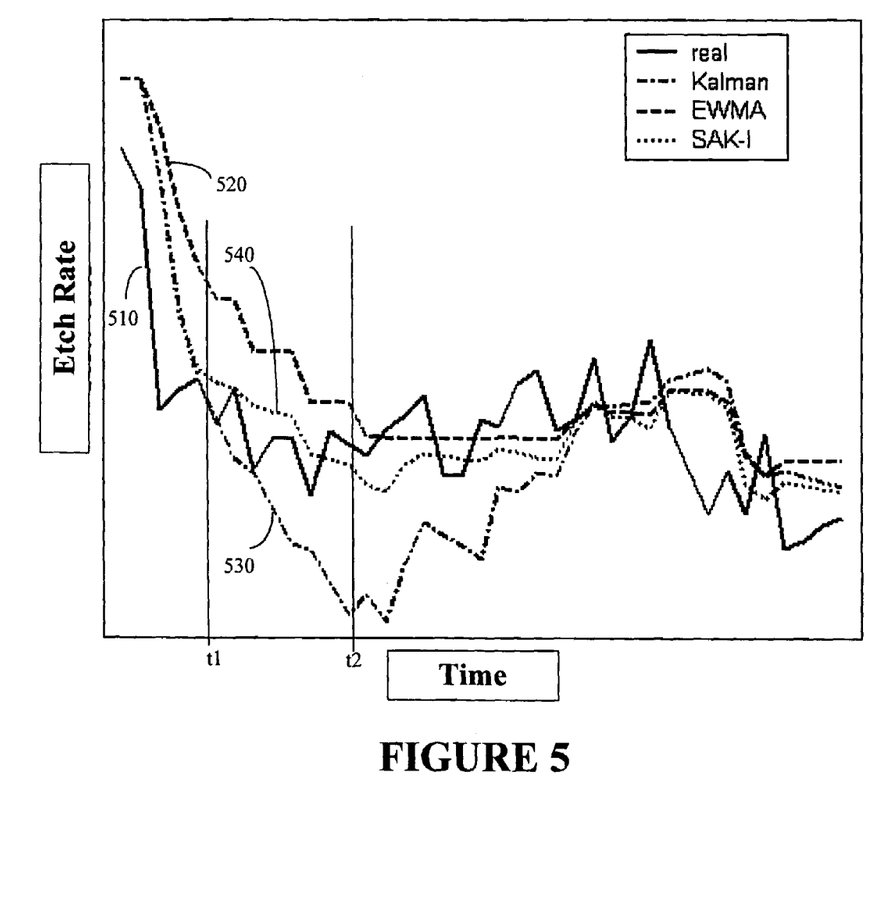
Figure 6:
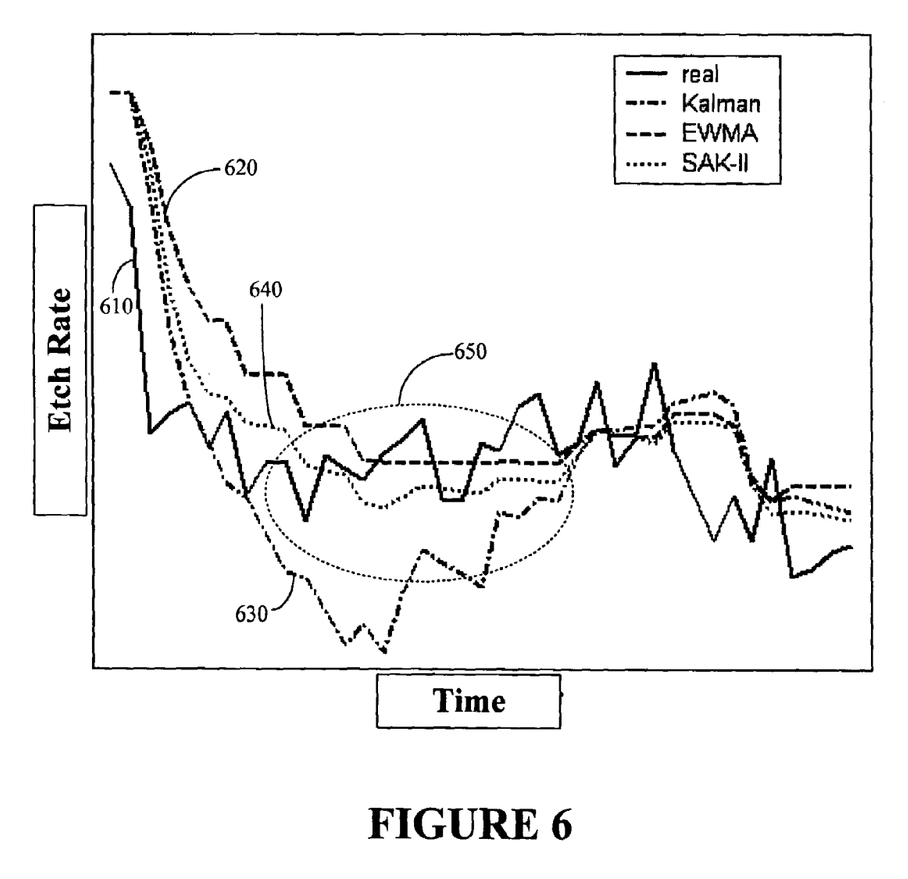

FIGS. 4-6 illustrate exemplary graphs of an etch process in which one or more embodiments of the present invention are employed for process state estimation (i.e., etch rate estimation, in the instant example). In FIG. 4, the state estimate modifying module 210 and the filter module 220 of FIG. 2 are employed to estimate the etch rate. In FIG. 5, the state estimate modifying module 210, the filter module 220, as well as the limit module 230 are employed to estimate the etch rate. In FIG. 6, all of the modules 210, 220, 230, and 240 of the estimator module 180 of FIG. 2 are employed to estimate the etch.

Referring in particular to FIG. 4, a graph of an etch process is illustrated in which the state estimate modifying module 210 and the filter module 220 are employed to estimate the etch rate. The x-axis represents time, and the y-axis represents the etch rate. In the illustrated example of FIG. 4, graph 410 represents the actual (or real) etch rate of the etch process, graph 420 represents the etch rate estimation by the conventional EWMA filtering technique, graph 430 represents the etch rate estimation by a conventional Kalman filter, and graph 440 represents the etch rate estimation by the estimator module 180 of the present invention in which modules 210 and 220 are employed.

The general path of graph 410 (the actual etch rate) illustrates that the etch rate generally drifts with time, and along the way, several disturbances are encountered (as evidenced by the presence of several peaks and valleys). As can been seen with reference to FIG. 4, when the process drifts fast (see time t1 where the slope of the line is relatively steep or large), the EWMA estimation graph 420 lags, and thus is not quick to follow the actual drift. With respect to the Kalman estimation graph 430, it is not very effective to the drift slope changes (see time t2). As can be seen, graph 440, which represents the state estimation of one embodiment of the present invention, is more adept to a fast drifting process as well as to a drift slope change.

Referring now to FIG. 5, a graph of an etch process is illustrated in which the state estimate modifying module 210, the filter module 220, and the limit module 230 of FIG. 2 are employed to estimate the etch rate. The x-axis represents time, and the y-axis represents the etch rate. In the illustrated example of FIG. 5, graph 510 represents the actual (or real) etch rate of the etch process, graph 520 represents the etch rate estimation by the conventional EWMA filtering technique, graph 530 represents the etch rate estimation by a conventional Kalman filter, and graph 540 represents the etch rate estimation by the estimator module 180 of the present invention in which modules 210, 220, and 230 are employed.

As can been seen with reference to FIG. 5, at time t1, graph 540 of the estimator module 180 is substantially closer to the actual etch rate (i.e., graph 510) than the EWMA estimation graph 520. This is because the limit module 230 of the estimator module 180 is employed in this example to reduce the amount of change that is allowed in the slope of the drift. Similarly, at time t2, graph 540 tracks the actual etch rate 510 closer than the Kalman graph 530 because of the limits placed on the drifting slope.

Referring now to FIG. 6, a graph of an etch process is illustrated in which the state estimate modifying module 210, the filter module 220, the limit module 230, and the EWMA module 240 of FIG. 2 are employed to estimate the etch rate. The x-axis represents time, and the y-axis represents the etch rate. In the illustrated example of FIG. 6, graph 610 represents the actual (or real) etch rate of the etch process, graph 620 represents the etch rate estimation by the conventional EWMA filtering technique, graph 630 represents the etch rate estimation by a conventional Kalman filter, and graph 640 represents the etch rate estimation by the estimator module 180 of the present invention in which modules 210, 220, 230 and 240 are employed.

As can been seen with reference to FIG. 6, the estimation of the etch rate by the estimator module 180, as indicated by graph 640, is improved around the region identified by reference number 650. This improvement is due in part to the application of the EWMA module 240 (see FIG. 2) to the output of the limit module 230.

Figure 7:
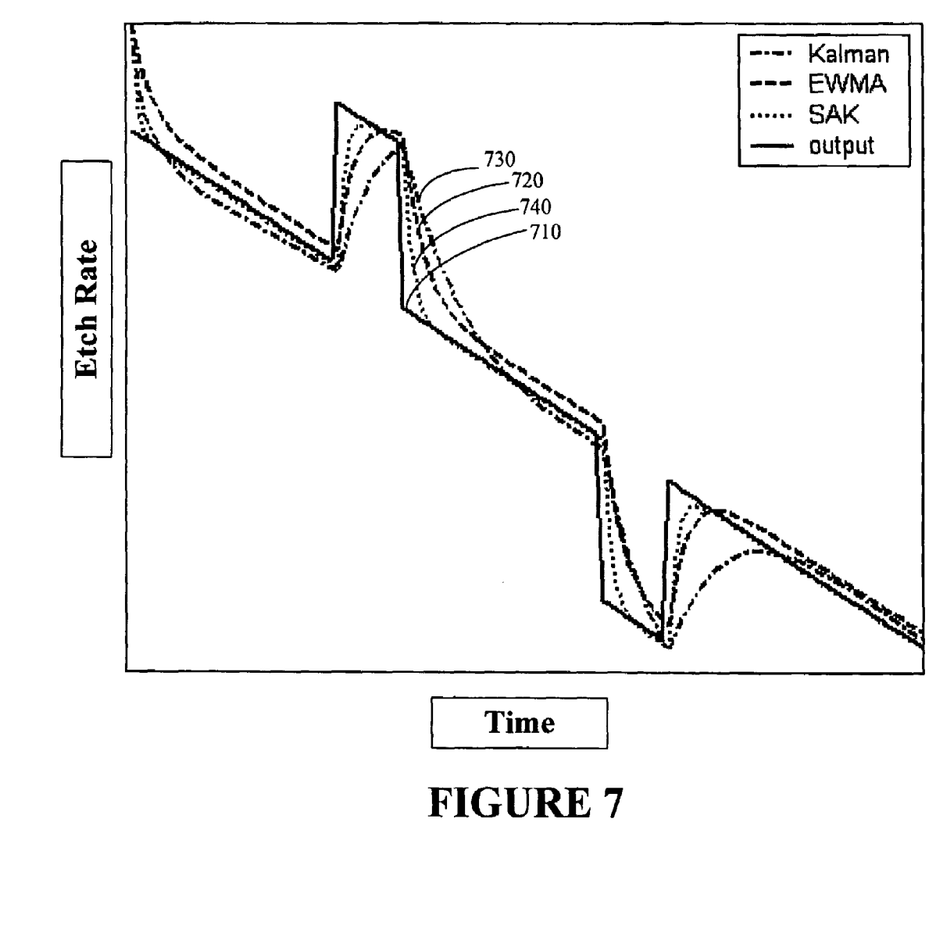

Referring now to FIG. 7, an exemplary simulation graph that compares the performance of the EWMA, the Kalman filter, and the estimator module 180 is illustrated, in accordance with one embodiment of the present invention. In particular, FIG. 7 illustrates a reference output graph 710, a state estimation graph 720 generated based on applying an EWMA filtering technique, a state estimation graph 730 generated based on applying a Kalman filter, and a state estimation graph 740 generated based on applying the estimator module 180 employing the state estimate modifying module 210 and the filter module 220 of FIG. 2. As can been seen in FIG. 7, the estimator module 180 of the present invention, as compared to the Kalman filter and EWMA, is more responsive to drift and step disturbances. Moreover, the graph shows that the steady state error from the estimator module 180 is smaller than those from the EWMA or Kalman filter.

One or more embodiments of the present invention improve the estimation of process states. The described embodiments are useful in estimating process states in a variety of processes that may drift with time. Because of their self-adaptive nature, the state estimation techniques described herein are effective in reacting to large step and drifting disturbances, while providing unbiased estimates with smaller mean square error.

The various system layers, routines, or modules may be executable by the control unit 156 (see FIG. 1). As utilized herein, the term "control unit" may include a microprocessor, a microcontroller, a digital signal processor, a processor card (including one or more microprocessors or controllers), or other control or computing devices. The storage unit 157 (see FIG. 1) referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
    processing a workpiece using a processing tool;
    measuring an output characteristic of the processed workpiece;
    modifying a previously estimated state of the processing tool based at least on the measured output characteristic;
    estimating, using a filter, a next state of the processing tool based at least on the modified previously estimated state; and
    processing a workpiece based on the estimated next state of the processing tool.

2. The method of claim 1, wherein processing comprises etching the semiconductor wafer and wherein measuring the output characteristic comprises measuring an etched depth of the semiconductor wafer.

3. The method of claim 1, wherein estimating the next state comprises providing the modified estimated process state to a Kalman filter to estimate the next state.

4. The method of claim 3, wherein modifying the previously estimated state comprises modifying the estimated state based on the measured output characteristic of the processed workpiece and on a measured output characteristic of a workpiece processed prior to the processed workpiece.

5. The method of claim 4, wherein modifying the previously estimated state comprises modifying the estimated state based on an average of the two measured output characteristics.

6. The method of claim 3, wherein the estimated next state includes a process rate state and a process drift state, further comprising limiting an amount of change in the process drift state to a preselected threshold value.

7. The method of claim 3, further comprising applying an exponentially weighted moving average filtering technique to the next state.

8. The method of claim 1, wherein estimating the next processing-tool state comprises providing the modified previously estimated process state to the filter to estimate the next processing-tool state.

9. An apparatus, comprising:
    an interface adapted to receive an output characteristic of a processed workpiece; and
    a control unit communicatively coupled to the interface, the control unit adapted to:
    modify a previously estimated processing-tool state based at least on the received output characteristic;
    determine, using a filter, a next processing-tool state based at least on the modified previously estimated state; and
    provide the determined next processing-tool state to process a workpiece.

10. The apparatus of claim 9, wherein the control unit is adapted to etch the semiconductor wafer and to measure an etched depth of the semiconductor wafer.

11. The apparatus of claim 9, wherein the control unit is adapted to provide the modified estimated state to a Kalman filter to estimate the next processing-tool state.

12. The apparatus of claim 11, wherein the control unit is adapted to modify the estimated state based on the received output characteristic of the processed workpiece and on a received output characteristic of a workpiece processed prior to the processed workpiece.

13. The apparatus of claim 12, wherein the control unit is adapted to modify the estimated state based on an average of the two received output characteristics.

14. The apparatus of claim 11, wherein the estimated next processing-tool state includes a process rate state and a process drift state, and wherein the control unit is adapted to limit an amount of change in the process drift state to a preselected threshold value.

15. The apparatus of claim 11, wherein the control unit is adapted to apply an exponentially weighted moving average filtering technique to the next processing-tool state.

16. The apparatus of claim 9, wherein the control unit is adapted to provide the modified previously estimated processing-tool state to the filter to determine the next processing-tool state.

17. An apparatus, comprising:
    means for processing a workpiece;
    means for measuring an output characteristic of the processed workpiece; and
    means for:
    modifying a previously estimated processing-tool state based at least on the measured output characteristic;
    providing the modified estimated state to a filter to determine a next processing-tool state, wherein the next processing-tool state is determined based at least on modified previously estimated state; and providing the determined next processing-tool state to process a workpiece.

18. An article comprising one or more machine-readable storage media containing instructions that when executed enable a processor to:

receive a measured output characteristic of a processed workpiece;

modify a previously estimated processing-tool state based at least on the received output characteristic;

estimate a next processing-tool state based at least on the modified estimated state, wherein estimating the next processing-tool state comprises providing the modified estimated state to a filter to calculate the next processing-tool state; and provide the estimated next processing-tool state to process a workpiece.

19. The article of claim 18, wherein the instructions when executed enable the processor to etch a semiconductor wafer and to measure an etched depth of the semiconductor wafer.

20. The article of claim 19, wherein the instructions when executed enable the processor to provide the modified estimated state to a Kalman filter to estimate the next processing-tool state.

21. The article of claim 20, wherein the instructions when executed enable the processor to modify the previously estimated state based on the received output characteristic of the processed workpiece and on a received output characteristic of a workpiece processed prior to the processed workpiece.

22. The article of claim 21, wherein the instructions when executed enable the processor to modify the previously estimated state based on an average of the two received output characteristics.

23. The article of claim 20, wherein the estimated next processing-tool state includes a process rate state and a process drift state, wherein the instructions when executed enable the processor to limit an amount of change in the process drift state to a preselected threshold value.

24. The article of claim 20, wherein the instructions when executed enable the processor to apply an exponentially weighted moving average filtering technique to the next processing-tool state.

25. A system, comprising:

a processing tool adapted to process a workpiece;

a controller adapted to:

receive a measured output characteristic associated with the processed workpiece;

modify a previous estimated process state of the processing tool based at least on the measured output characteristic;

provide the modified previous estimated process state to a filter to calculate a next process state, wherein the next process state is calculated based at least on modified previous estimated process state; and provide the next process state to process a workpiece.

26. The system of claim 25, wherein an advanced process control framework is coupled between the processing tool and the controller.

* * * * *